(12) United States Patent
Marra et al.

(10) Patent No.: US 6,347,840 B1
(45) Date of Patent: Feb. 19, 2002

(54) ECP COMMANDED EMERGENCIES VIA A CONVENTIONAL EAB BRAKE CONTROLLER

(75) Inventors: Jon M. Marra, Henderson; Dale R. Stevens, Adams Center; James R. Truglio, Watertown; John W. LaDuc, Harrisville, all of NY (US); Roger B. Lewis, Stem, NC (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/783,218

(22) Filed: Feb. 15, 2001

(51) Int. Cl.$^7$ ................................................ B60T 13/66
(52) U.S. Cl. ................................ 303/3; 303/7; 303/15; 303/86; 303/20
(58) Field of Search ................................ 303/3, 15, 18, 303/20, 16, 33–38, 7–9, 86, 128; 701/19, 20, 35; 246/167 R, 182 R

(56) References Cited

U.S. PATENT DOCUMENTS

| 4,652,057 | A | | 3/1987 | Engle et al. |
|---|---|---|---|---|
| 5,538,331 | A | | 7/1996 | Kettle, Jr. |
| 5,590,042 | A | | 12/1996 | Allen, Jr. et al. |
| 5,984,427 | A | | 11/1999 | Kettle, Jr. |
| 6,042,201 | A | * | 3/2000 | Marra et al. .................. 303/3 |

FOREIGN PATENT DOCUMENTS

| EP | 1084925 | * | 3/2001 |
|---|---|---|---|

\* cited by examiner

*Primary Examiner*—Douglas C. Butler
(74) *Attorney, Agent, or Firm*—Barnes & Thornburg

(57) ABSTRACT

An integrated pneumatic and electropneumatic train brake system and method of operation. An electropneumatic brake controller in at least one of the locomotives provides an emergency brake signal on a brake pipe and the network to the pneumatic and electropneumatic brakes for an emergency position of the operator interface. The brake controller also provides an emergency signal only on the network to the electropneumatic brakes in the continuous service position of the operator interface.

8 Claims, 7 Drawing Sheets

ECP COMMANDED EMERGENCIES VIA A CONVENTIONAL EAB BRAKE CONTROLLER

BACKGROUND AND SUMMARY OF THE INVENTION

The present invention relates generally to electrically controlled pneumatic train brakes and computer controlled train brake systems, and more specifically, to emergency braking in integrated braking systems.

Computer controlled brake systems are well known as exemplified by CCBI and CCBII available from New York Air Brake Corporation. These systems provide computer controls of the pneumatic control unit for the pneumatic pipes running throughout the train. This allows pneumatic control of the locomotive as well as the individual car brakes. More recently, the industry has been striving to provide electrically controlled pneumatic or electropneumatic brakes on each of the cars. This has led to the electrically controlled pneumatic ECP system which is independent of the computer control braking system. An overview of such a system is EP-60 available from New York Air Brake Corporation.

As presently implemented, the ECP system in the locomotive runs in parallel to that of the conventional pneumatic locomotive train controls. Two brake valves are provided, one being the brake valve for the pneumatic braking and the other being the ECP brake valve. Similarly, separate displays are provided for each system. The locomotive or the consist of the locomotives do not respond to the brake commands made by the ECP system since the locomotives respond to pneumatic signals on pipes. Also, the ECP system has its own discreet input from the event recorder and from the locomotive controls to determine penalties.

With the implementation of electrically controlled pneumatic or electropneumatic brakes, there has been discussion of the desirability of integrating the computer controlled braking systems with the electrical controlled pneumatic brake systems.

The present invention is an integrated pneumatic and electropneumatic train brake system and method including a brake pipe extending through locomotives and cars on the train. An operator interface has at least release, service, continuous service and emergency positions. An electropneumatic brake system in the cars and locomotives is connected to the brake pipe and interconnected by an electrical network. An electropneumatic brake controller in at least one of the locomotives provides an emergency brake signal on the brake pipe and the network for the emergency position of the operator interface and provides an emergency brake signal only on the network for the continuous service position of the operator interface. The operator interface further includes a service zone between a minimum and a full service position and a suppression position. The brake controller transmits brake signals on the brake pipe in a pneumatic mode of operation and on the network in an electric mode of operation. The operator interface includes an automatic train brake handle having the positions and may also include an independent handle for locomotive brakes.

Other objects, advantages and novel features of the present invention will become apparent from the following detailed description of the invention when considered in conjunction with the accompanying drawings.

DETAILED DESCRIPTION OF THE PREFERRED EMBODIMENT

Although the present brake system will be described using EP-60 electropneumatic train brake system and CCBI/CCBII computer controlled locomotive brake system as an example of two systems which may be integrated, the present integrated system can be implemented using other similar pneumatic EAB and electropneumatic ECP systems for train and locomotive brake controls.

Figure 1:
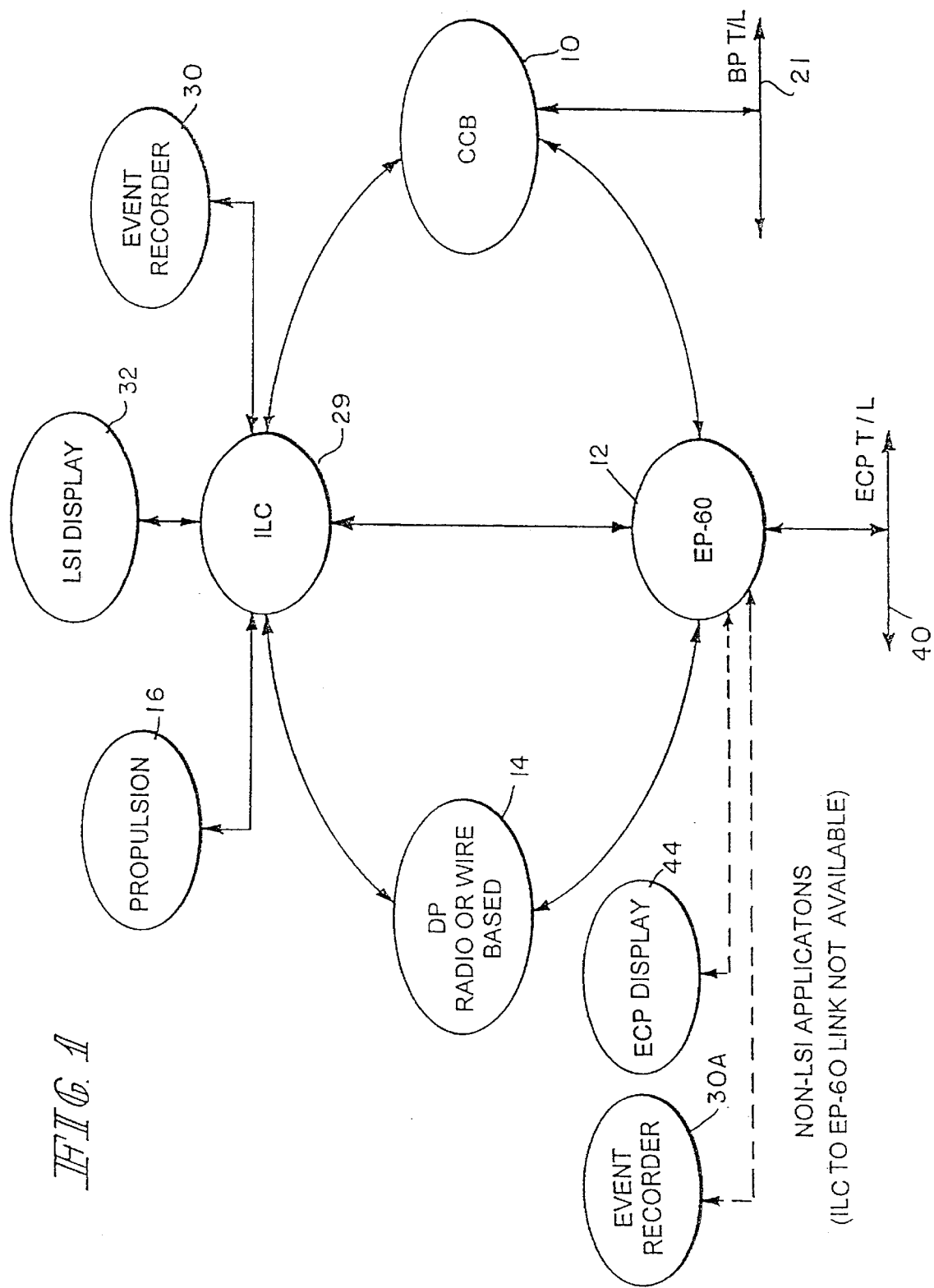
FIG. 1 is a diagram of the architecture of a typical integrated train electrical and pneumatic brake system for a locomotive system integration and non-locomotive system integration applications.

An overview of the system architecture is illustrated in FIG. 1. A computer controlled locomotive brake system 10 is illustrated as a CCB. It controls the brake pipe train line 21. It is connected to an electropneumatic train brake system 12, which is illustrated as an EP-60 and controls a electropneumatic trainline 40. An integrated locomotive computer (ILC) 29 is connected to the CCB 10 and the EP-60 12. A distributed power system DP 14 is also provided and connected to the ILC 29. The ILC 29 is also connected to a propulsion-system 16 and transmits information to the event recorder 30. An integrated display 32 is also connected to the ILC 29.

For non-locomotive system integration applications, namely where the ILC link to the EP-60 12 is not provided, an operator interface unit or ECP display 44 is provided and connected to the EP-60 and a separate event recorder 30A is connected to the EP-60. The event recorder 30 may be a separate and distinct device or integrated into the ILC 29. If it is a separate event recorder, it is the same event recorder as 30A.

Figure 2:
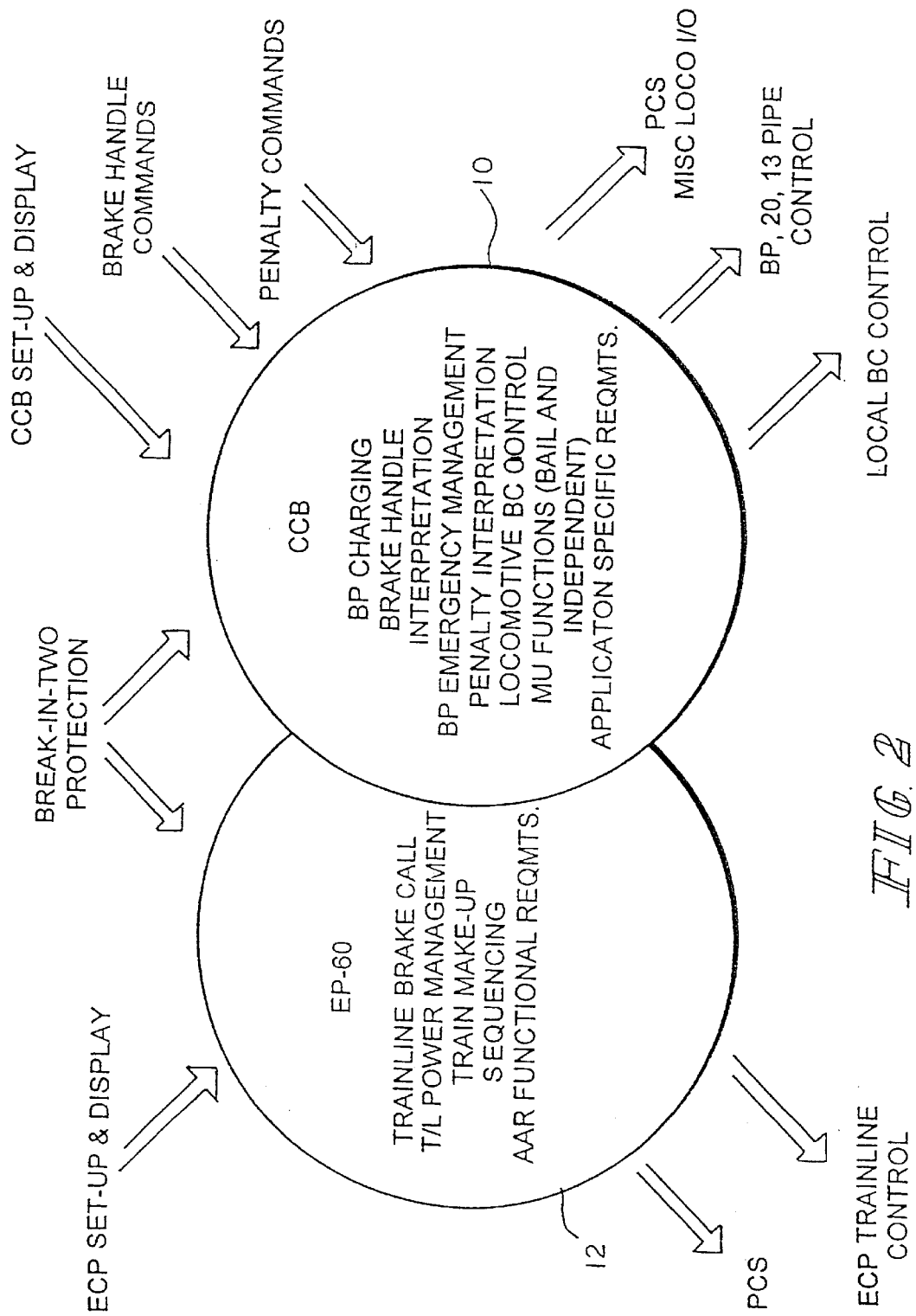
FIG. 2 is a diagram of system proportioning between the computer controlled brake system and an electropneumatic brake system.

The partitioning of the operation of the various operations performed by EP-60 and CCB is illustrated in FIG. 2. The EP-60 receives an ECP set up and display information. It provides outputs to the power cut-off switch PCS of the locomotive system as well as the ECP trainline control. The EP-60 is responsible for the ECP trainline brake call, trainline power management, train makeup and sequencing and other AAR functional requirements.

The CCB receives inputs from the CCB set up and display, brake handle commands and penalty commands. It provides outputs to the PCS and other miscellaneous locomotive input/outputs. It also controls the brake pipe, the 20 pipe and the 13 pipe as well as local brake cylinder controls. The CCB is responsible for brake pipe charging, brake handle interpretation, brake pipe emergency management, penalty interpretation, locomotive brake cylinder control, multi-unit operation function or MU functions (bail and independent), and application of locomotive specific requirements.

The interaction and the transfer of signals and control between EP-60 and the CCB will be explained with respect to a standard or pneumatic braking and electrical braking.

Figure 3:
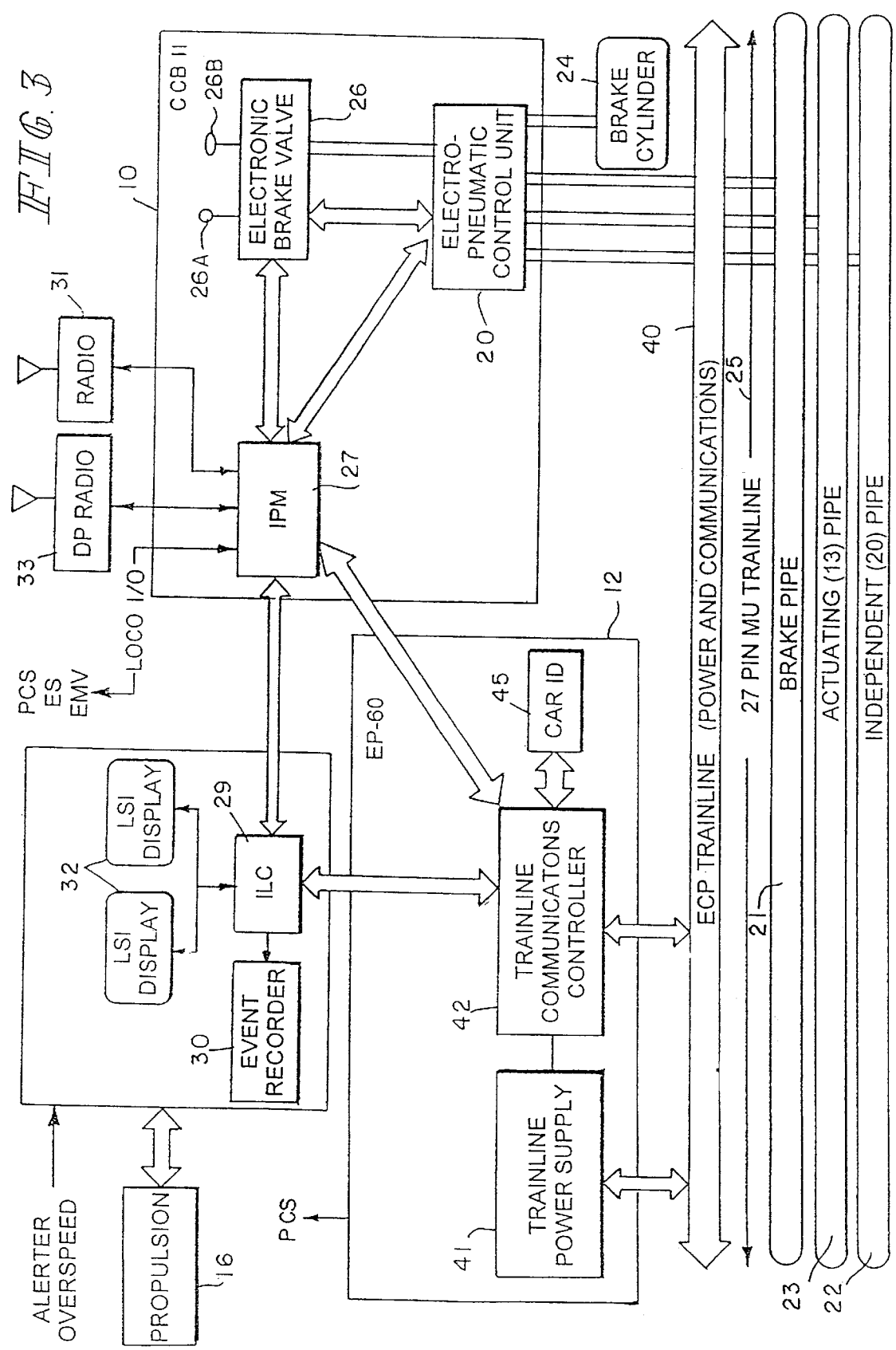
FIG. 3 is a block diagram of the integration of a computer controlled brake system and a first electropneumatic brake system for locomotive system integration application.

An example of a computer controlled locomotive brake system 10 in FIG. 3 includes an electropneumatic control unit (EPCU) 20 responsive to input signals to control the pressure on brake pipe 21, independent application and release pipe (#20) 22 and the actuating pipe (#13) 23 and the brake cylinders 24 on its locomotive. The independent application and release pipe 22 and the actuating pipe 23 run throughout the locomotive consist and allow independent control of the locomotive brakes as distinguished from the control of the pneumatic brakes in each of the car by the brake pipe 21 running throughout the train. Electrical communication and control of the locomotives in the consist is available over the 27-pin mu wire 25. This is generally under the control of the propulsion control system (not shown).

A computer controlled brake system 10 is shown, for example as a CCBII, and includes an integrated processor module IPM 27 which electrically controls the pneumatic control unit 20. The IPM 27 receives inputs from an electronic brake valve EBV 26 having an automatic brake handle 26A to control the train brakes via the brake pipe 21 and an independent brake handle 26B to control the locomotive brakes via independent pipe 22 and actuating pipe 23. The EBV 26 is an operator brake controller or interface. An integrated locomotive computer ILC 29 connects the IPM to an event recorder 30 and displays 32. The event recorder 30 may be a separate element or integral to the ILC 29. Penalties, for example Alerter and Overspeed are inputs to the ILC 29. The propulsion system 16 communicates with the ILC 29. The lead propulsion system communicates with other locomotives in its consist via MU trainline 25.

The IPM 27 is connected to other locomotive systems, not shown, and provides typical outputs, such as a power cut-off switch signal PCS, emergency sand signal ES and emergency magnetic valve EMV. The IPM 27 may be integrated with distributed power DP 14 and would communicate via radio module 33 to the other locomotives in the consist as well as distributed throughout the train. An end of train radio 31 communicates to the end of train device.

The connection between the IPM 27, the brake valve 26 and the electropneumatic control unit 20 is by a common bus. The suggested connection is a LonWorks bus wherein each of the modules is a node on the network. The connection between the IPM 27 and the ILC 29 is a standard serial link, for example, an RS422-HDLC. The system as described so far is well known and need not be described in further detail.

The controls of an electrically controlled pneumatic brake system ECP of the prior art is illustrated as EP-60 available from New York Air Brake Corporation, for example. The electric controlled pneumatic brakes includes a trainline power supply TPS 41, which converts battery power from the locomotive to power for the ECP train line 40. This is an electric line that runs throughout the train and provides electrical power and communications to EP-60 brakes on each car and if available on locomotives. A trainline communication controller TCC 42 is connected to the ECP trainline 40 as a node on the trainline network. A car ID node 45 is shown as part of the EP-60 system. In the prior art, the TCC 42 has no control over the pneumatic brake lines 21, 22 and 23. It only controls communication, either providing or receiving information, via the ECP trainline 40. Thus, it can only communicate with other locomotives in the train which have ECP trainline controllers or ECP car nodes on the network and connected to the ECP trainline 40. Although the ECP trainline is shown as a line running through each car in the train, it is to be understood that the ECP network may be by radio or other non-wire connection.

As implemented in the prior art, the ECP brake system runs in parallel to that of the conventional pneumatic or computer control locomotive train controls. The two brake valves are provided, one being the pneumatic brake valve and the other being the ECP brake valve. Similarly, separate displays are provided. The locomotive or the consist of the locomotives do not respond to the brake commands made by the ECP locomotive system. Also, the ECP system has its own discrete input from the event recorder 30A and locomotive controls to determine penalties.

The integrating of the computer controlled braking systems 10 with the electrical controlled pneumatic brake system 12 is achieved by interconnecting these systems as nodes on a common network as shown. The integration results in having only a single brake control valve or operator interface, namely the CCB control valve 26, and eliminating the ECP control valve. Also, separate access to the event recorder 30, end of train device and a display for the TCC 42 is not required and is available from the computer control brake portion 10 in or directly from the ILC. Access to the penalties and other locomotive controls for the TCC 42 is also through the computer control brake system 10 or directly from the ILC. Finally, the ability of the locomotive brakes to be under the electronic controlled pneumatic system TCC 42 is provided.

As shown in FIG. 3, the ILC 29 is directly connected by, for example, an RS 422 HDLC serial communications link to the TCC 42 in locomotive system integration applications. This provides access to the event recorder 30 via the ILC 29. For non- integrated applications, the TCC 42 may have its own operator interface 44, not shown.

The train control signal from the brake valve 26 is provided to the IPM 27 and, depending upon whether the IPM 27 is in the pneumatic or the electrical mode, either controls the electro-pneumatic control unit 20 for control of brake pipe 21, or provides the brake command signals to the TCC 42 which provides electrical train brake signals over the ECP trainline 40. The IPM 27 will not reduce the equalization reservoir ( not shown) in response to the brake valve automatic handle movements in the ECP mode as it would in the pneumatic mode. This keeps the brake pipe 21 fully charged in the electrical mode.

All locomotives equipped with ECP will respond to the control signal on the ECP trainline 40 to apply its brakes in response to an ECP application. Simultaneously, the lead and any remote ECP equipped locomotive will apply the proportional pneumatic brake signal on the independent brake application and release pipe 22. The signal on this pipe will be monitored by the trailing locomotive units that do not have ECP capability and will apply the locomotive brakes accordingly.

A switch or set-up process will provide an indication to the IPM controller 27 whether it should be operating in the pneumatic or the electric control mode.

The IPM 27 in combination with the EBV 26 in FIG. 3 form a brake controller which provides locomotive and train brake commands. TCC 42 forms a first brake control connected to the brake controller 27,26 and transmits a car brake signal on the network or ECP trainline 40 for train brake commands. A second brake control, which includes electro-pneumatic control unit 20, is also connected to the brake controller 27,26 and transmits a locomotive brake signal on the locomotive brake pipe, which is independent pipe 22, for locomotive brake commands. For distributed power, the integrated locomotive computer 29 in combination with the IPM 27 interfaces to the propulsion system 16 and the locomotive systems with the brake system to transmit propulsion signals via TCC 42 to remote locomotives. The applying and release of the locomotive brakes using the independent pipe 22 can be achieved as well as bail-off without using the actuating pipe 23 or brake pipe 21. Thus, the actuating pipe 23 may be deleted.

As previously discussed, the brake controller 27,26 has a pneumatic mode and an electrical mode. The default mode for power up and certain types of failure is the pneumatic mode. In the electrical mode, the brake controller 27,26 provides trainline brake signals on trainline 40 for the cars and locomotives that have ECP brakes and are connected to the trainline 40. In the pneumatic mode, the brake controller 27,26 provides the train or car brake signals on the brake pipe 21. For both the electrical and pneumatic mode, the control unit 20 provides locomotive braking signals on the locomotive brake pipe or independent brake pipe 22.

Figure 4:
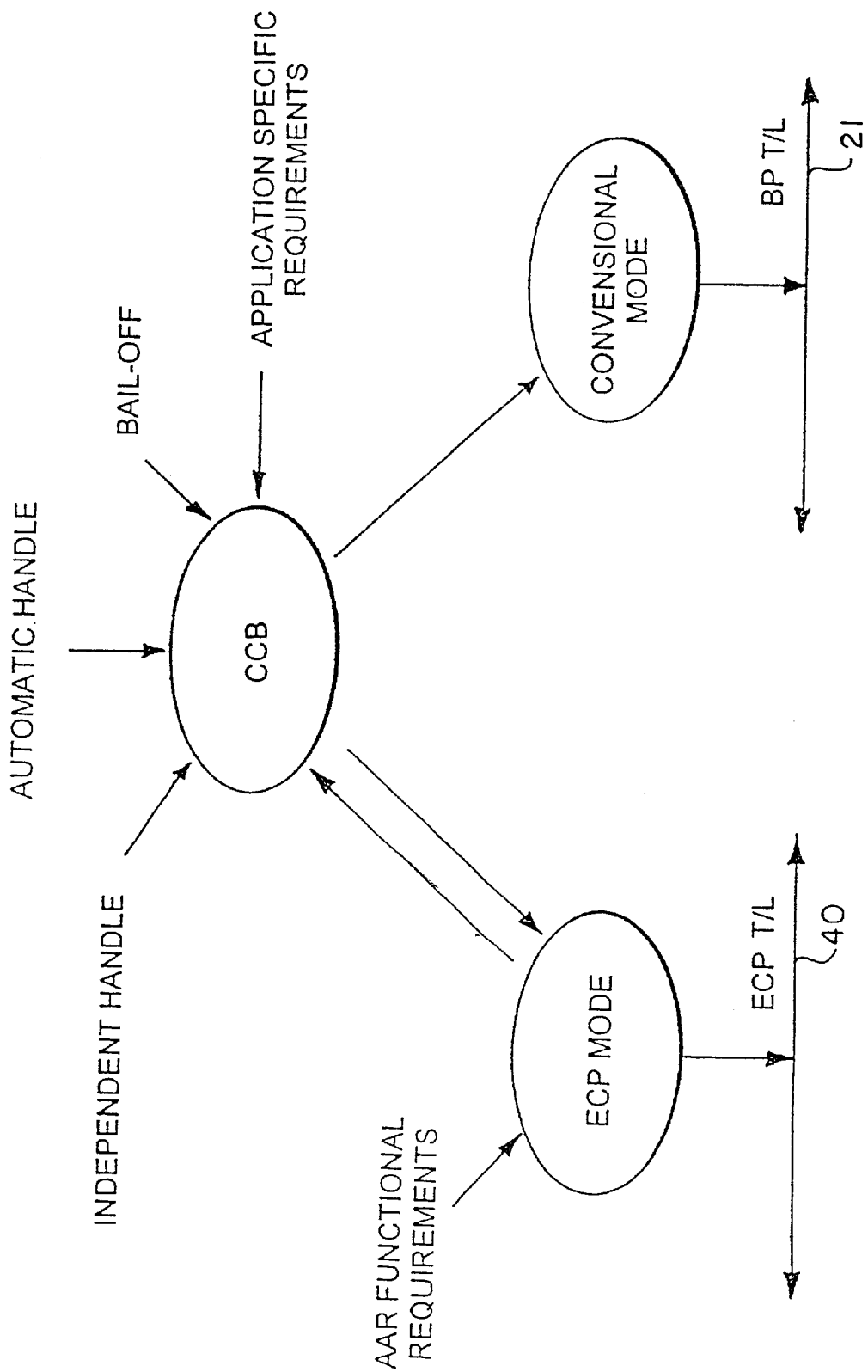
FIG. 4 is a block diagram illustrating brake valve control of the integrated system.
Figure 6:
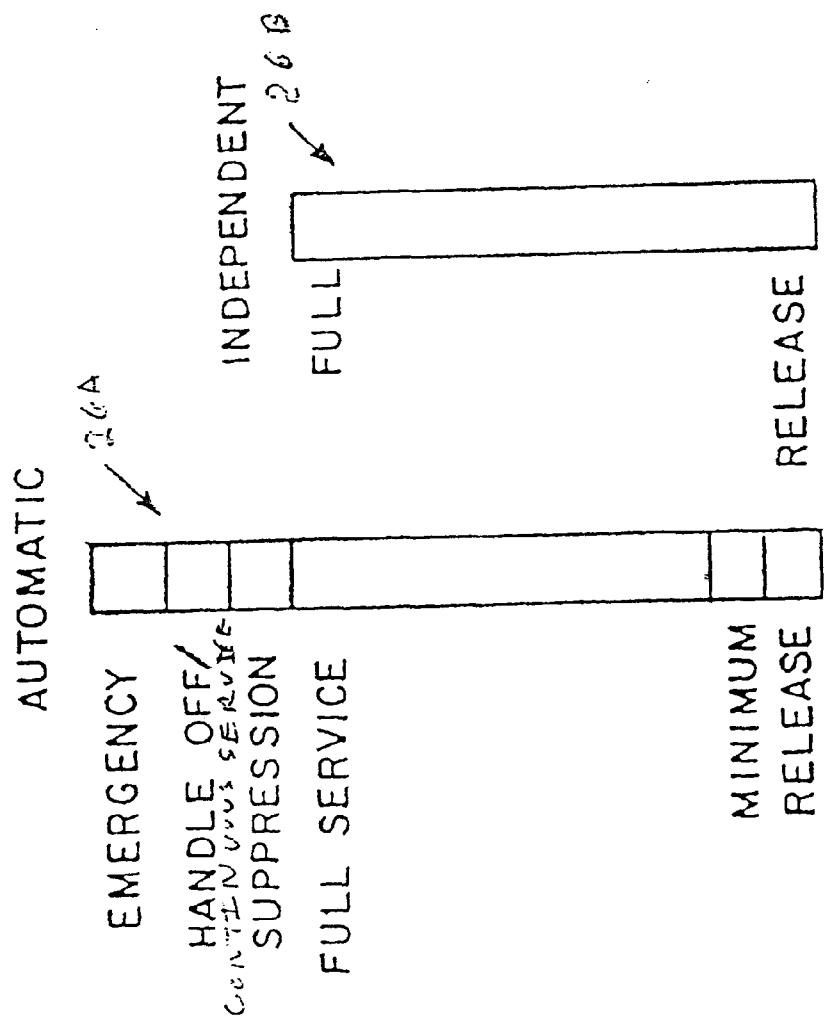
FIG. 6 is a schematic representation of the automatic and independent brake control handle positions

An overall view of the brake valve control is illustrated in FIG. 4. The EBV 26 provides an automatic handle, independent handle and bail-off inputs to the CCB which also executes application specific requirements for the locomotive. In a conventional or pneumatic mode, it controls the electro-pneumatic control unit 20 to control the brake pipe 21. In the electrical mode, there is communication between the EP-60 12 and the CCB 10 which controls the ECP trainline 40. The positions of the automatic handle 26A and the independent handle 26B are shown in FIG. 6.

In the electrical mode, the actuation of the automatic handle 26A is processed by the IPM 27 and provides train brake signals to TCC 42. TCC 42 then provides an electrical train braking signal on the ECP trainline 40. It also provides back to IPM its electrical train signal, and the IPM 27 in turn provides braking commands to the electro-pneumatic control unit 20. The electro-pneumatic control unit 20 then provides an appropriate brake cylinder pressure for the brake cylinder 24 of that locomotive. The TCC's 42 on other remote locomotives provide the received train braking commands to their IPM's 27 which controls its electro-pneumatic control unit 20 to apply its brakes or brake cylinder 24.

The TCC 42 also, through IPM 27, commands the electro-pneumatic control unit 20 to apply a braking signal to the independent pipe 22. This allows pneumatic actuation of the trailing locomotive brakes allowing the locomotive consist to have non-ECP equipped trailing locomotives or the trail ECP locomotives could have their electric mode cut-out or disabled. Thus, in the electrical mode, the brake cylinder control function of the electro-pneumatic control unit 20 is controlled by the TCC 42 and not by the EBV 26.

Since the independent pipe 22 is used to provide pneumatic signals to trail locomotives even in the electric mode, accommodations must also be made for the operation of the independent handle 26B in the electric mode. If the independent brake handle 26B is operated in the electric mode, the EBV 26 provides a signal to the TCC through IPM 27. The TCC 42 then provides a command back through IPM 27 to the electro-pneumatic control unit 20 to apply a pneumatic brake signal on the independent pipe 22. If the ECP trainline 40 and the TCC 42 have the capabilities, they provide a locomotive braking signal to other ECP equipped locomotives connected to the ECP trainline 40. If the automatic handle 26A and the independent handle 26B are both braking at the same time, the more restrictive braking command is used to control the locomotive brakes.

Similarly, distributed power signals can be sent on the ECP trainline 40 addressed to the remote locomotives in both the pneumatic and electrical modes. This would include distributed power commands, status and exceptions signals.

Figure 5:
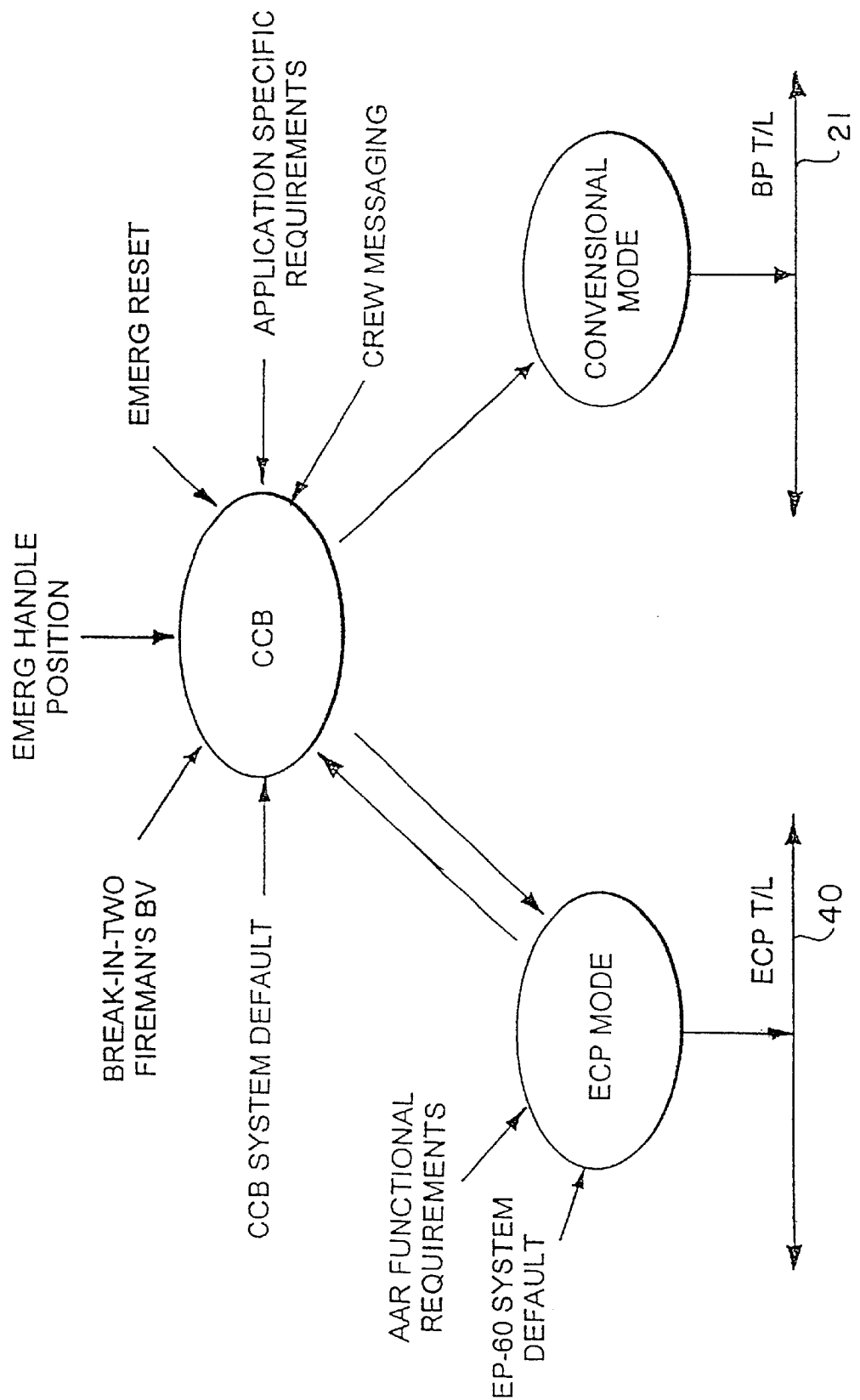
FIG. 5 is a block diagram of the electric mode emergency control of the integrated system.

The controller 27,26 can determine a system initiated emergency brake command or an operator initiated emergency brake command, as illustrated in FIG. 5. The operator initiated brake commands will come from the brake valve 26 in an emergency handle position. The system initiated brake commands include an electrical system emergency or a pneumatic system emergency. The electrical system emergencies include EP-60 system defaults and CCB system defaults. The pneumatic system emergencies include break-in-two and Fireman's Brake Valve.

For emergencies, the controller 27,26 provides signals to the TCC 42 which transmits an emergency brake signal on the network for system and operator initiated emergency brake commands. The controller 27,26 provides commands to the control unit 20 which transmits an emergency brake signal on the train and locomotive brake pipes 21,22 for operator initiated and pneumatic system initiated emergency brake commands. Thus, for electrical system emergency brake commands, only the ECP brake is applied, while for operator and pneumatic system emergency brake commands, the ECP and the pneumatic brake systems are operated. The train brake signals and the locomotive brake signals are transmitted on the trainline 40 as a percentage of brake signals.

An emergency magnetic valve EMV, under the control of TCC 42 may be provided in parallel to the electro-pneumatic control unit 20. If the distributed power system DP includes the emergency magnetic valve, the TCC 42 may jointly control the magnetic valve. The electromagnetic valve EMV is activated only in the pneumatic or operator initiated emergencies. The operator initiated emergencies in this context is moving the automatic handle to the emergency position to produce a pneumatic and electric emergency.

The TCC 42 will control electrical resetting and IPM 27 will control pneumatic resetting after an operator initiated or pneumatic system initiated emergency. The TCC 42 will control electrical resetting after an electrical system initiated emergency and after the automatic handle 26A has been in full service or suppression for a fixed time before release position can be selected.

The automatic brake handle 26A has six positions as illustrated by the sector diagram in FIG. 6 and defined as follows for ECP brake operation:

a) The Release position is for releasing the train brakes and initially charging the brake pipe in ECP mode.

b) In the Minimum Brake position, the ECP train brake command is increased to minimum service level so as to initiate the minimum level train brake (typically 15% train Brake Command), and lightly apply the train brakes.

c) The sector or zone between the Minimum and Full Service positions is the service zone. As the automatic brake valve handle is move through this zone from Minimum toward Full Service, train brake command is increased to 100% with the handle at the Full Service position, a full service brake application is obtained.

d) In addition to providing full service brake application as with the brake valve handle in the Full Service positions, Suppression of overspeed control and safety control application is obtained in the Suppression position.

e) The Handle Off/ Continuous Service position provides the train operator the ability to command only an ECP emergency brake application of 120% without initiating a conventional pneumatic emergency brake. This position is also used for trailing units of a multiple unit locomotive or for locomotive's being towed"dead" in a train.

f) The Emergency position is used for making brake valve emergency brake applications and results in brake pipe exhaust and brake pipe venting at the highest rate of reduction to 0 psi, as well as an ECP 120% emergency brake command.

The independent brake handle 26B has two extreme positions, Release and Full Application separated by an application zone. The handle is moved from the Release position through the application zone toward the Full Application position to apply the locomotive brakes. The independent handle 26B can be depressed so as to cause the release or bail off of any automatic brake application existing on the locomotive (due to operation of the automatic brake handle 26A). If the independent brake handle 26B is in an Application position, the locomotive brake will be applied according to the higher of independent or automatic brake.

When the automatic handle 26A is placed in the emergency position, both an ECP trainline emergency and a conventional pneumatic trainline emergency will result. In this position, the conventional pneumatic brake controller is designed to vent brake pipe to atmosphere at an emergency rate. When operating in electrical mode, it is desirable not to vent the brake pipe pressure. To provide the train engineer the ability to command an emergency brake application in electrical mode without venting brake pipe, the emergency position cannot be used.

The present integrated air brake system is designed to command an "ECP Only" emergency when the automatic handle 32A is placed in the Continuous Service (Handle-Off) position. In the prior art (conventional pneumatic) applications, this position is used to continuously reduce brake pipe pressure at a service rate to continue the service brake command through the over-reduction of brake pipe.

With ECP brake control, continuously reducing brake pipe provides no benefit in the operation of the electropneumatic brake. Additionally, the continuous service/handle-off position also provides no added benefit for ECP service brake control. The ECP full service brake command is always achieved when the brake handle 26A is placed in the full service position. As a result, the continuous service/handle-off position can be used for the "ECP Only" command position. With this feature, the train engineer has the option to move the brake handle 26A into the continuous service/handle-off position to initiate an "BECP Only" emergency brake command or into the emergency position to initiate both. The "ECP Only" emergency brake trainline command and a conventional pneumatic emergency brake trainline command is initiated from the emergency position.

The "ECP Only" emergency brake command feature provides the train operator the ability to command an emergency level train brake without venting the brake pressure to 0 psi. With this, several conventional pneumatic system related problem are eliminated. It eliminates brake pipe recharge time and significantly decreases emergency brake release time. It reduces supply air usage to recharge brake pipe. It reduces train related delays due to failed open emergency valves preventing brake pipe recharge.

Figure 7:
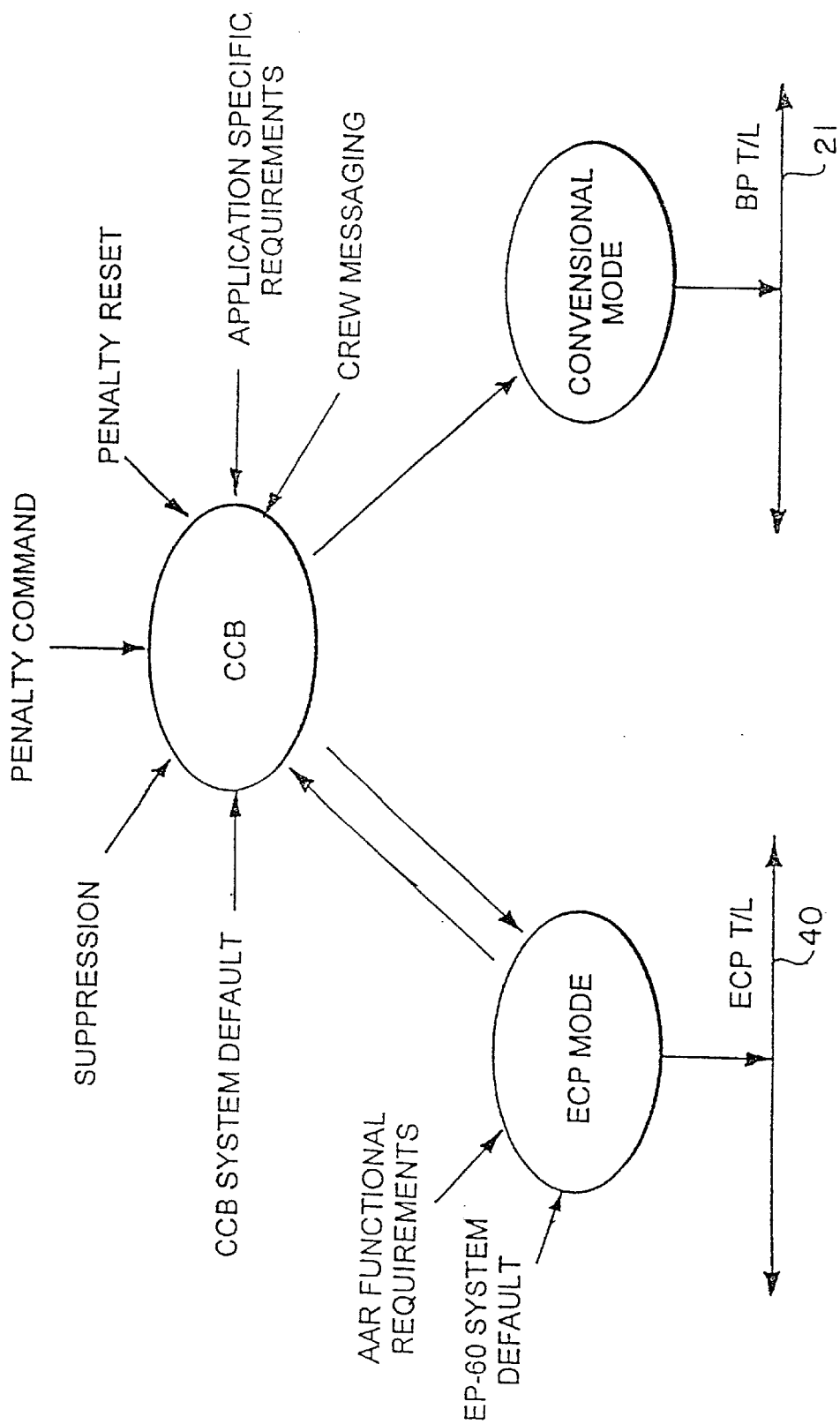
FIG. 7 is a block diagram of the penalty control of the integrated system.

The controller 27,26 provides penalty brake commands, as illustrated in FIG. 7. For these penalty brake commands in the electrical control mode, it provides penalty brake command signals to the control TCC 42 to transmit a car brake signal on the network for penalty brake commands. Penalty braking is generally a full service brake command. As with other car brake signals on the network, the brake pipe 21 is maintained charged.

A penalty acknowledgment is needed from the TCC 42 to IPM 27. If it is not received, the IPM 27 will command a pneumatic emergency application using the electro-pneumatic control unit 20.

Controller 27 also determines whether suppression brake command has occurred to either remove or prevent the application of a penalty brake. This is the suppress position of the automatic brake handle of the electric brake valve 26. If the suppression brake commands occur during a penalty brake command, the controller 27,26 does not send control or brake command signals to the TCC 42 or removes and interrupts any penalty application which control TCC 42 provides on the ECP trainline 40. As is well known, the controller 27,26 provides a power cutoff signal to the locomotive propulsion system for penalty brake commands.

In prior systems, moving the automatic brake handle to the suppression position causes a brake pipe reduction which applies the train brakes. This is undesirable and avoided by the present system, which uses the suppression position only as an electric control signal and does not produce pneumatic results in the brake pipe 21.

As can be seen, in an ECP train, the brake pipe is primarily an air supply and is not used for brake controls. In the present system, the brake pipe 21 is used as a back up to allow pneumatic operation of the train brakes as well as for operator and pneumatic system initiated emergencies. With future acceptance by the industry of ECP brakes, the train brake pipe 21 and the locomotive pipes 22 and 23 may have no control functions. In an all ECP train, the independent locomotive brake pipe 22 and the actuating locomotive pipe 23 can be eliminated. All signals will be sent out over the ECP trainline 40. Thus, trainline braking signals will be addressed separately to cars and locomotives, and special locomotive braking signals will be addressed only to locomotives.

It should also be noted in the present system, even those which include the independent brake pipe 22 with or without the actuating pipe 23, that those locomotives which have ECP brakes preferably will receive their brake signal over the electric trainline 40. Those locomotives that do not have ECP brakes will receive the signals pneumatically over the independent or locomotive brake pipe 22. Those locomotives which are not adjacent to the lead locomotive and not connected to other locomotives by the independent brake pipe 22 will either receive their signals by radio 33 or the remote locomotive may have ECP capability and receive its signals on ECP trainline 40. It may then control other adjacent locomotives on its consist pneumatically if they are connected by an independent pipe 22.

Another example of a remote locomotive would be a helper locomotive which is attached at the end of the train when needed to ascend a certain grade. These locomotives would be ECP equipped and would take their locomotive brake signals off the ECP trainline 40. These would include automatic, independent and bail-off commands.

The brake controller 27 will power up in a conventional or pneumatic mode. In order to be switched over to the electrical mode, it must be selected as a lead locomotive and then switched over to the electric mode.

Integrating or coordinating the electrically controlled pneumatics or the ECP system through the computer control brake system, allows enhancement of safety. The computer controlled brake system can determine whether the electrical controlled pneumatics 42 are operating and if not, provide pneumatic control of the brake pipe 21 to ensure braking throughout the train. Also, by providing a single brake control valve 26 and a single display 32, the operator need not make a decision in an emergency on whether to switch from electrical controls to pneumatic controls. The operator uses a single handle and a single display and selects whether to use pneumatic or electrical controls. If the electrical controlled brakes are not operative, the system will automatically switch to pneumatic control without any other input from the operator. Thus, not only does the integration increase reliability of the two systems, but also substantially removes operator error.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An integrated pneumatic and electropneumatic train brake system comprising:

a brake pipe extending through locomotives and cars on the train;

an operator interface having at least release, service, continuous service and emergency positions;

an electropneumatic brake system in the cars and locomotives and connected to the brake pipe and interconnected by an electrical network; and an electropneumatic brake controller in at least one locomotive, and the brake controller providing an emergency brake signal on the brake pipe and the network for the emergency position of the operator interface and providing an emergency brake signal only on the network for the continuous service position of the operator interface.

2. The system according to claim 1, wherein the operator interface further includes a service zone between a minimum and full service position and a suppression position.

3. The system according to claim 1, wherein the brake controller transmits brake signals on the brake pipe in a pneumatic mode of operation and on the network in an electric mode of operation.

4. The system according to claim 1, wherein the operator interface is an automatic train brake handle having the positions.

5. The system according to claim 4, wherein the operator interface further includes an independent brake handle for the locomotive brakes.

6. The system according to claim 1, wherein the brake controller transmits a service brake signal on the train brake pipe as long as the continuous service position of the operator interface is present.

7. A method of operating a brake system of a train which includes a train brake pipe extending through locomotives and cars in the train, electropneumatic brakes on the locomotives and cars connected to the train brake pipe and an electrical network, a brake controller on the locomotives providing brake commands, and an operator interface having at least release, service, continuous service and emergency positions, the method comprising:

determining if the operator interface is in the continuous service or emergency positions;

transmitting an electric emergency brake signal on the network for determined continuous service or emergency positions of the operator interface ; and transmitting a pneumatic emergency brake signal on the train brake pipe only for a determined emergency position of the operator interface.

8. The method according to claim 7, including transmitting a service brake signal on the train brake pipe as long as the continuous service position of the operator interface is determined.

\* \* \* \* \*